United States Patent
Hong et al.

(10) Patent No.: US 8,587,178 B2
(45) Date of Patent: Nov. 19, 2013

(54) ROTOR OF HIGH SPEED INDUCTION MOTOR AND MANUFACTURING METHOD THEREOF

(75) Inventors: Seungsu Hong, Busan (KR); Seongu Yang, Busan (KR)

(73) Assignee: GEM Co., Ltd., Busan (KR)

( * ) Notice: Subject to any disclaimer, the term of this patent is extended or adjusted under 35 U.S.C. 154(b) by 198 days.

(21) Appl. No.: 13/201,532

(22) PCT Filed: Sep. 30, 2010

(86) PCT No.: PCT/KR2010/006652
§ 371 (c)(1),
(2), (4) Date: Aug. 15, 2011

(87) PCT Pub. No.: WO2012/011637
PCT Pub. Date: Jan. 26, 2012

(65) Prior Publication Data
US 2012/0019091 A1  Jan. 26, 2012

(30) Foreign Application Priority Data
Jul. 22, 2010 (KR) .................. 10-2010-0070767

(51) Int. Cl.
*H02K 1/06* (2006.01)

(52) U.S. Cl.
USPC .............. 310/216.137; 310/211; 310/261

(58) Field of Classification Search
USPC .......... 310/166, 171, 211, 262, 261, 216.061, 310/216.137
IPC ...................................... H02K 17/16
See application file for complete search history.

(56) References Cited

U.S. PATENT DOCUMENTS

| | | | | |
|---|---|---|---|---|
| 4,485,320 A | * | 11/1984 | Kawada et al. | 310/216.129 |
| 5,140,211 A | * | 8/1992 | Ucida | 310/156.61 |
| 5,378,953 A | * | 1/1995 | Uchida et al. | 310/156.59 |
| 5,422,527 A | * | 6/1995 | Lazzaro | 310/211 |
| 6,930,427 B2 | * | 8/2005 | Grant et al. | 310/216.016 |
| 2002/0153802 A1 | * | 10/2002 | Kliman et al. | 310/261 |

FOREIGN PATENT DOCUMENTS

| | | |
|---|---|---|
| JP | 10-028360 A | 1/1998 |
| JP | 10-234166 A | 9/1998 |
| KR | 1020090107862 * | 10/2009 |
| KR | 10-0963533 B1 | 6/2010 |

OTHER PUBLICATIONS

Electrinic translation , APA, KR 1020090107862.*
English Language Abstract of JP 10-028360 A.
English Language Abstract of JP 10-234166 A.
English Language Abstract of KR 10-0963533 B1.

* cited by examiner

*Primary Examiner* — Nguyen N Hanh
(74) *Attorney, Agent, or Firm* — Rabin & Berdo, P.C.

(57) ABSTRACT

A rotor of an ultra high speed induction motor includes a stacked body having a plurality of loop type steel sheets stacked to form a cylinder, with a plurality of slots circumferentially formed in a lengthwise direction of the stacked body. Loop type upper, lower end rings are disposed on the upper and lower portions of the stacked body and having a plurality of upper and lower through-holes, respectively, to correspond to the slots. Conductive bars are coated with fusible bonding flux and are inserted into the upper through-holes, the slots, and the lower through-holes such that the conductive bars are integrally bonded into the upper through-holes, the slots, and the lower through-holes, following the fusion and solidification of the fusible bonding flux.

2 Claims, 3 Drawing Sheets

ROTOR OF HIGH SPEED INDUCTION MOTOR AND MANUFACTURING METHOD THEREOF

BACKGROUND OF THE INVENTION

1. Field of the Invention

The present invention relates, in general, to a rotor of an ultra high speed induction motor, in which a conductive bar is coupled to a slot of the rotor, and a method of manufacturing the same.

2. Description of the Related Art

Generally, induction motors are apparatuses that receive electric energy and convert it into a rotational motion, and include a stator, around which windings are distributed, and a cylindrical rotor which is inserted into the stator to cause an induced current by a magnetic field that is induced by alternating current flowing through the stator windings.

FIG. 1 is a perspective view showing a rotor of a conventional induction motor.

The rotor of the conventional induction motor includes a cylindrical stacked body 10 which consists of a plurality of loop type electric steel sheets that are stacked to form a cylinder, with slots (not shown) formed at regular intervals around circumferences of the sheets, a conductive bar 20 made of a conductive material (copper, aluminum, copper alloy, or the like) and inserted into the respective slots, and an end ring 30 which is coupled to upper and lower portions of the stacked body 10 such that it is combined with the conductive bars 20.

The conductive bar 20 has the length larger than the cylindrical stacked body 10, and is welded to a plurality of through-holes 32 of the upper and lower end rings 30 by means of brazing, soldering, or Ar-type welding, with the opposite ends thereof inserted through the through-holes of the upper and lower end rings.

In manufacture of the rotor, as shown in the figure, the lower end ring 30, the cylindrical stacked body 10, and the upper end ring 30 are sequentially arranged on a jig, and a fastening cover 110 is placed thereon and tightly fastened by a nut 120.

Then, the conductive bars 20 are inserted through the through-holes 32 of the end rings 30 and the slots of the cylindrical stacked body 10, and are welded to the end rings by performing welding on a gap g between themselves and the through-holes 32 using the above-mentioned welding method. The gap g is created because the diameter of the slot and through-hole 32 is made larger than the diameter of the conductive bar 20 in order to facilitate the insertion of the conductive bar 20 into the slot and the through-hole 32.

While the rotor having the above-mentioned construction has mainly been applied to a high speed electric motor, with a tendency to demand an ultra high speed electric motor in the industrial fields, problems should be solved in connection with materials, strength, or deformation, for example, of the rotor for realizing the ultra high speed revolution.

This is because the rotor is subjected to deformation or defectiveness in joint parts due to a centrifugal force occurring upon ultra high speed revolution of the rotor, thereby causing a weakened balancing feature and reduced lifetime.

Particularly, since the conductive bars are only welded and bonded to the end rings, but are simply inserted into the cylindrical stacked body while maintain the gap therewith, upon high speed revolution, the above-mentioned problems may be intensified.

SUMMARY OF THE INVENTION

Accordingly, the present invention has been made keeping in mind the above problems occurring in the related art, and the present invention intends to propose a rotor of an ultra high speed induction motor in which a conductive bar coated with bonding flux is inserted and integrally brazed into a slot of a cylindrical stacked body forming the rotor of the induction motor, and a manufacturing method thereof.

In order to achieve the above object, according to one aspect of the present invention, there is provided a rotor of an ultra high speed induction motor including a stacked body having a plurality of loop type steel sheets stacked to form a cylinder, with a plurality of slots circumferentially formed in a lengthwise direction of the stacked body, a pair of loop type upper, lower end rings disposed on the upper and lower portions of the stacked body and having a plurality of upper and lower through-holes, respectively, to correspond to the slots, and a plurality of conductive bars coated with fusible bonding flux and inserted into the upper through-holes, the slots, and the lower through-holes such that the conductive bars are integrally bonded into the upper through-holes, the slots, and the lower through-holes, following the fusion and solidification of the fusible bonding flux.

According to another aspect of the present invention, there is provided a method of manufacturing a rotor of an ultra high speed induction motor, the method including sequentially arranging a lower end ring having a plurality of circumferentially provided lower through-holes, a stacked body having a plurality of slots, and an upper end ring having a plurality of circumferentially provided upper through-holes such that the lower through-holes, the slots, and the upper through-holes are aligned with each other and compressing and fixing the lower end ring, the stacked body, and the upper end ring such that they become close to each other, electrically plating bonding flux onto conductive bars, inserting the plated conductive bars into the upper through-holes, the slots, and the lower through-holes, and annealing a resultant object at a temperature at which only the bonding flux is fused, such that gaps created between the upper and lower through-holes and slots and the conductive bars are filled with the fused bonding flux, and cooling the fused bonding flux such that the conductive bars are integrally bonded into the upper and lower through-holes and slots.

In an exemplary embodiment, a loop type steel fixing ring may be further coupled to the outsides of the respective upper, lower end rings.

According to the construction of the present invention, the conductive bars can be completely bonded to the stacked body in a very simple manner, thereby preventing breakage of the rotor revolving at an ultra high speed and ensuring stable driving of the rotor, contributing to development of a speedier induction motor.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to a preferred embodiment of the invention, an example of which is illustrated in the accompanying drawings. The description and drawings are provided for only illustrative purposes, so the scope of the present invention is not limited thereto. Further, known constructions and functions that may make the present invention ambiguous will be omitted from the description.

Figure 1:
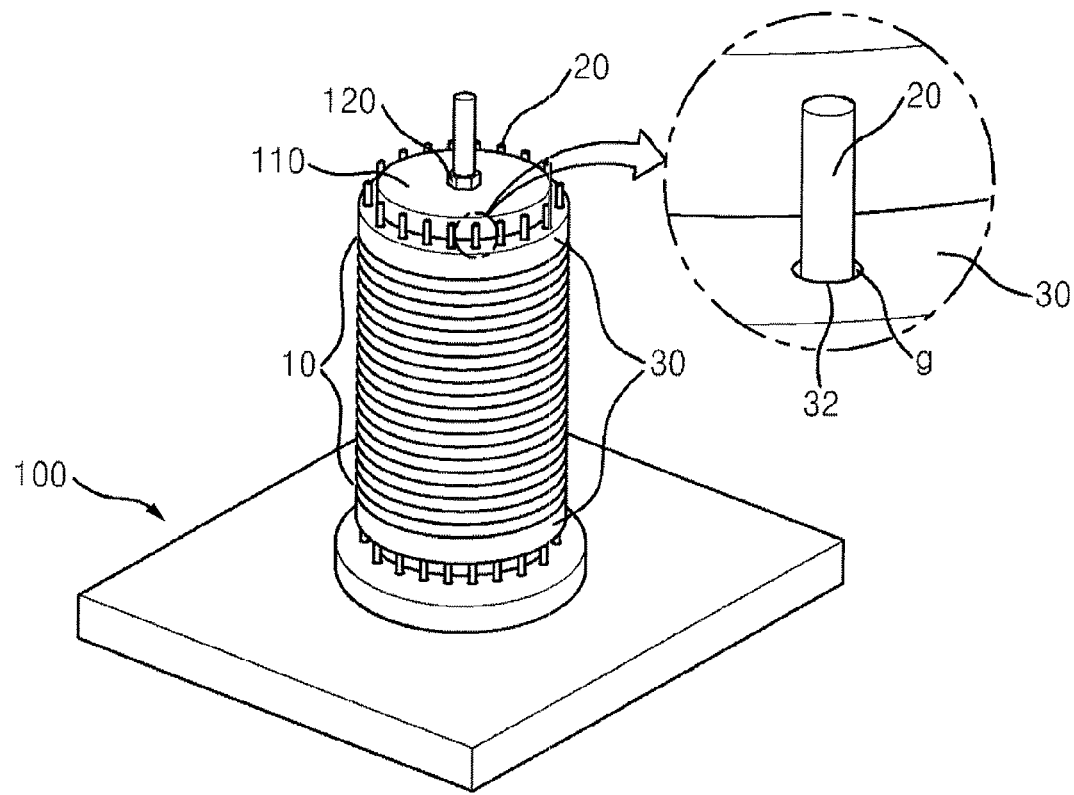
FIG. 1 is a perspective view showing a rotor of a conventional induction motor.

In an aspect, the present invention provides a rotor of an ultra high speed induction motor, a general structure of which is simply illustrated in FIG. 1.

The rotor includes in general a stacked body 10, a conductive bar 20, and an end ring 30.

The stacked body 10 consists of a plurality of loop type electric steel sheets that are stacked to form a cylinder, with a plurality of slots 12 circumferentially formed at regular intervals in the sheets such that the slots 12 are aligned in a longitudinal direction of the stacked body 10.

The conductive bar 20 has the form of a bar or rod, and is inserted into the respective slots 12 such that opposite ends thereof are not embedded in, but extend out of the stacked body 10. The conductive bar 20 may be made of a conductive material such as Cu, Al, Cu-alloy, etc., but Cu is the most common material.

The end rings 30 which are generally made of the same material as the conductive bar 20 and have a type of loop are respectively coupled to upper and lower portions of the stacked body 10. That is, the end rings consist of upper and lower end rings 30a and 30b which are coupled to the upper and lower portions of the stacked body 10, and the respective end rings have a plurality of through-holes 32 which has the size and position to correspond to the respective slots 12. Thus, the conductive bar 20 is inserted into and coupled to the through-holes 32.

Figure 2:
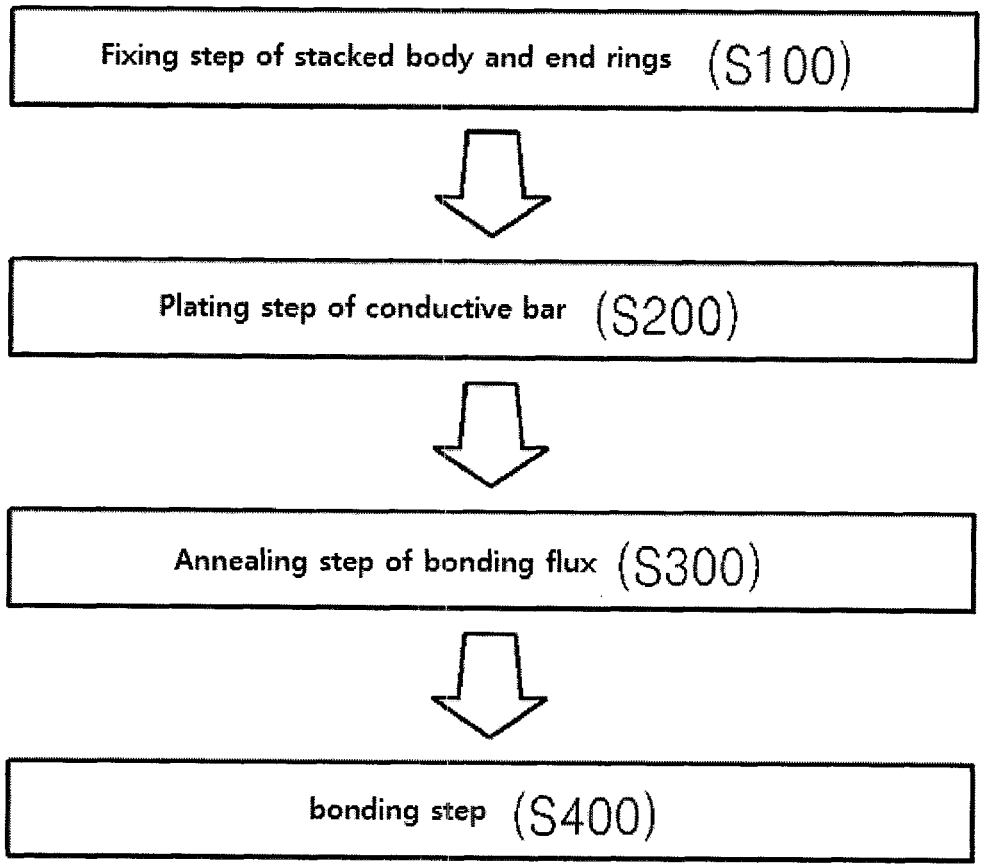
FIG. 2 is a flow chart showing a procedure of a method of fabricating a rotor of an ultra high speed induction motor according to an exemplary embodiment.

Next, a method of manufacturing a rotor of an ultra high speed induction motor and the rotor manufactured by the method will be described with reference to FIGS. 2 and 3. FIG. 2 is a flow chart showing a procedure of the method of fabricating the rotor of an ultra high speed induction motor according to an exemplary embodiment, and FIG. 3 is a cross-sectional view showing the rotor of an ultra high speed induction motor according to the manufacturing method shown in FIG. 2.

The manufacturing method generally includes fixing step S100, plating step S200, annealing step S300, and bonding step S400.

First, in fixing step S100, the lower end ring 30b, the stacked body 10, and the upper end ring 30a are sequentially placed and are compressed and fixed such that they become close to each other.

Figure 3:
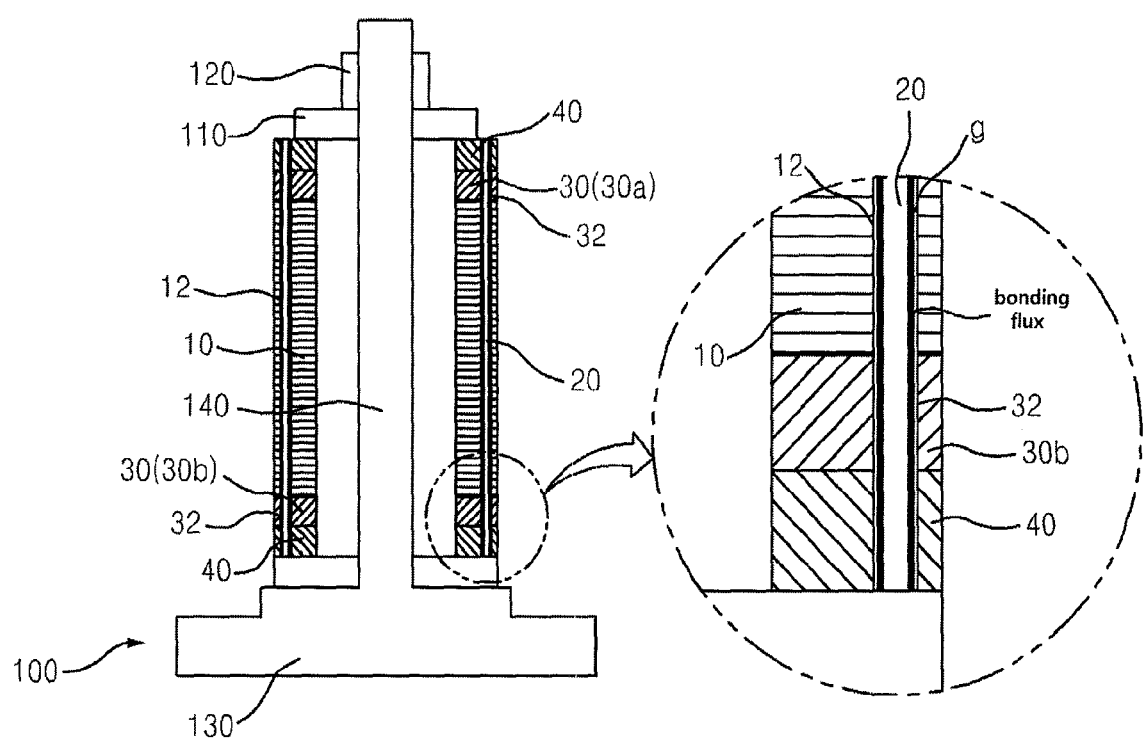
FIG. 3 is a cross-sectional view showing the rotor of an ultra high speed induction motor according to the manufacturing method shown in FIG. 2.

To perform this step, as shown in FIG. 3, a jig 100 consisting of a planar support 130 and a vertical rod 140 extending from the planar support 130 is provided, and the lower end ring 30b, the stacked body 10, and the upper end ring 30a are sequentially placed through the vertical rod.

Next, a fastening cover 110 is mounted on the upper end ring 30a and a nut 120 is fastened to the vertical rod 140 such that the fastening cover 110 compresses the upper end ring 30a, thereby allowing the lower end ring 30b, the stacked body 10, and the upper end ring 30a to become firmly close to each other without a gap therebetween.

Here, the lower through-holes 32 of the lower end ring 30b, the slots 12 of the stacked body 10, and the upper through-holes 32 of the upper end ring 30a are fixedly arranged so as to be aligned to each other such that the conductive bar 20 is inserted into all of the upper through-holes 32, the slots 12, and the lower through-holes 32.

Next, in plating step S200, the conductive bar 20 is plated with bonding flux by electroplating.

This step is an important process of the present invention in which the conductive bar 20 is electrically plated with bonding flux. Here, the bonding flux is one for brazing bonding that may be made of high conductive Au, Ag, or the like. However, the bonding flux is conventionally made of Ag.

Further, the bonding flux may be made of an Ag-alloy containing a portion of Mn, P, Cu, Zn, and Cd.

For reference, the thickness of the bonding flux plated onto the conductive bar 20 can be formed to correspond to an amount that is required to bond the conductive bar 20 by controlling the plating time.

Next, in annealing step S300, after the conductive bar 20, which had been plated in the plating step S200, has been inserted into the upper through-holes 32, the slots 12, and the lower through-holes 32, which are aligned in the upper end ring 30a, the stacked body 10, and the lower end ring 30b, which were fixed together in the fixing step S100, annealing is performed at a temperature at which only the plated bonding flux is fused.

If the conductive bar cannot be smoothly inserted, it can be forcedly inserted using a separate device.

The annealing may preferably be performed in a heating furnace such as a vacuum furnace, an atmosphere heat-treatment furnace, or a continuous type furnace, and the annealing temperature is a temperature suitable to fuse only the bonding flux.

After annealing, the bonding flux is fused and liquefied, so that it fills a gap g between the conductive bar 20 and the slots 12 and a gap g between the conductive bar 20 and the through-holes 32.

Next, in the bonding step S400, the fused bonding flux filling the gap g is cooled so as to bond the slots 12 and through-holes 32 and the conductive bar 20 to each other.

This is similar to brazing or soldering method in which the liquefied bonding flux is solidified by reducing the temperature of the heating furnace, thereby performing the bonding action.

The conventional conductive bar 20 was only bonded to the end rings 30, whereas the present conductive bar 20 is integrally bonded also to the stacked body 10, thereby providing excellent durability even upon ultra high speed revolution.

In addition, a loop type steel fixing ring 40 may preferably be further coupled to the outsides of the respective upper, lower end rings 30a and 30b. The fixing ring 40 can serve to prevent breakage of the upper and lower end rings that are vulnerable to ultra high speed revolution.

While the fixing ring 40 may be coupled using a conventional fastening method, it is preferred that as shown in FIG. 3, similar to the end ring 30, through-holes are formed in the fixing ring 40, and the conductive bar 20 coated with the bonding flux is then inserted into the through-holes so that the fixing ring can be bonded with the conductive bar by means of the fusible bonding flux.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A rotor of an high speed induction motor, the rotor comprising:
   a stacked body having a plurality of loop type steel sheets stacked to form a cylinder, the stacked body having a plurality of slots circumferentially formed in a lengthwise direction of the stacked body;

a loop type upper end ring disposed on the upper end of the stacked body and having a plurality of upper through-holes corresponding to the plurality of slots of the stacked body;

a loop type lower end ring disposed on the lower end of the stacked body and having a plurality of lower through-holes corresponding to the plurality of slots of the stacked body;

a plurality of conductive bars coated along the entire length with fusible bonding flux by electroplating and inserted through the upper through-holes, the slots, and the lower through-holes such that the conductive bars are integrally bonded into the upper through-holes, the slots, and the lower through-holes, following the fusion and solidification of the fusible bonding flux;

a loop type upper fixing ring coupled to an outside of the upper end ring; and a loop type lower fixing ring coupled to an outside of the lower end ring.

2. A method of manufacturing a rotor of an high speed induction motor, the method comprising:

preparing a jig having a planar support and a vertical rod extending from the center of the planar support in a vertical direction;

sequentially arranging a loop type lower fixing ring, a lower end ring having a plurality of circumferentially provided lower through-holes, a stacked body having a plurality of slots, an upper end ring having a plurality of circumferentially provided upper through-holes and a loop type upper fixing ring on the jig such that the lower through-holes, the slots, and the upper through-holes are aligned with each other;

providing a fastening cover on the upper fixing ring;

fastening a nut to the vertical rod to compress and fix the lower fixing ring, the lower end ring, the stacked body, the upper end ring and the upper fixing ring such that they become close to each other;

preparing conductive bars plated with bonding flux along the entire length of the conductive bars by electroplating;

inserting the plated conductive bars through the upper through-holes, the slots, and the lower through-holes;

annealing a lower fixing ring, a lower end ring, a stacked body, an upper end ring and an upper fixing ring at a temperature at which the bonding flux is fused, such that gaps created between the upper and lower through-holes and slots and the conductive bars are filled with the fused bonding flux; and cooling the fused bonding flux such that the conductive bars are integrally bonded into the upper and lower through-holes and slots.

* * * * *